(12) United States Patent
Rabenold et al.

(10) Patent No.: US 9,037,497 B2
(45) Date of Patent: *May 19, 2015

(54) LIVE AUCTION PARTICIPATION UTILIZING A COUPLED BIDDING DEVICE

(71) Applicants: Nancy J. Rabenold, Brandon, FL (US); James A. Simmons, Brandon, FL (US)

(72) Inventors: Nancy J. Rabenold, Brandon, FL (US); James A. Simmons, Brandon, FL (US)

(73) Assignee: XCIRA, INC., Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/307,050

(22) Filed: Jun. 17, 2014

(65) Prior Publication Data

US 2014/0304100 A1    Oct. 9, 2014

Related U.S. Application Data

(63) Continuation of application No. 13/781,693, filed on Feb. 28, 2013, which is a continuation-in-part of application No. 12/685,647, filed on Jan. 11, 2010, now Pat. No. 8,412,587, which is a continuation of (Continued)

(51) Int. Cl.
*G06Q 30/08* (2012.01)
*G06Q 30/06* (2012.01)

(52) U.S. Cl.
CPC ............ *G06Q 30/08* (2013.01); *G06Q 30/0601* (2013.01)

(58) Field of Classification Search
USPC .............................................. 705/26, 37, 27
IPC ........................................ G06Q 30/08,30/0601
See application file for complete search history.

(56) References Cited

U.S. PATENT DOCUMENTS

| | | | | |
|---|---|---|---|---|
| 3,581,072 A | * | 5/1971 | Nymeyer | 705/37 |
| 4,412,287 A | * | 10/1983 | Braddock, III | 705/37 |
| 4,789,928 A | * | 12/1988 | Fujisaki | 705/37 |
| 5,189,630 A | * | 2/1993 | Barstow et al. | 709/246 |
| 5,664,111 A | * | 9/1997 | Nahan et al. | 705/26.8 |
| 5,710,895 A | * | 1/1998 | Gerber et al. | 715/719 |
| 5,774,873 A | * | 6/1998 | Berent et al. | 705/26.3 |
| 5,794,219 A | * | 8/1998 | Brown | 705/37 |
| 5,818,914 A | * | 10/1998 | Fujisaki | 379/93.12 |

(Continued)

FOREIGN PATENT DOCUMENTS

| | | |
|---|---|---|
| WO | WO9201574 A1 | 9/1992 |
| WO | WO9927476 A3 | 6/1999 |
| WO | WO 00/36533 A1 | 6/2000 |

OTHER PUBLICATIONS

Bid.com: "Bid.com and American Interactive Media make internet history with successful launch of first live streaming video auction," PR Newswire, Apr. 29, 1999, Dialog file 621, #01860387, 2pgs.*

(Continued)

*Primary Examiner* — Rob Pond
(74) *Attorney, Agent, or Firm* — Smith Risley Tempel Santos LLC; Gregory Scott Smith

(57) ABSTRACT

The ability to participate in an active auction is enabled for remote bidders by allowing the remote bidder to use a bidding device coupled to an active auction through a network. The remote bidding device receives live audio from the auction with minimal delay, and can receive and provide bidding information to the auction in real time. As such, the remote bidder can participate with equal standing as local participants.

11 Claims, 15 Drawing Sheets

Related U.S. Application Data application No. 11/164,796, filed on Dec. 6, 2005, now Pat. No. 7,664,677, which is a continuation-in-part of application No. 10/913,886, filed on Aug. 6, 2004, now Pat. No. 7,716,090, which is a continuation of application No. 09/866,191, filed on May 25, 2001, now Pat. No. 6,813,612.

(60) Provisional application No. 60/207,030, filed on May 25, 2000.

(56) References Cited

U.S. PATENT DOCUMENTS

| | | | | |
|---|---|---|---|---|
| 5,835,896 | A * | 11/1998 | Fisher et al. | 705/37 |
| 5,845,265 | A * | 12/1998 | Woolston | 705/37 |
| 5,890,138 | A * | 3/1999 | Godin et al. | 705/26.3 |
| 5,905,974 | A * | 5/1999 | Fraser et al. | 705/36 R |
| 5,905,975 | A * | 5/1999 | Ausubel | 705/37 |
| 6,006,201 | A * | 12/1999 | Berent et al. | 705/26.3 |
| 6,012,045 | A * | 1/2000 | Barzilai et al. | 705/37 |
| 6,021,398 | A * | 2/2000 | Ausubel | 705/37 |
| 6,023,685 | A * | 2/2000 | Brett et al. | 705/37 |
| 6,026,383 | A * | 2/2000 | Ausubel | 705/37 |
| 6,035,289 | A * | 3/2000 | Chou et al. | 705/36 R |
| 6,044,363 | A * | 3/2000 | Mori et al. | 705/37 |
| 6,047,274 | A * | 4/2000 | Johnson et al. | 705/412 |
| 6,055,518 | A * | 4/2000 | Franklin et al. | 705/37 |
| 6,058,379 | A * | 5/2000 | Odom et al. | 705/37 |
| 6,078,906 | A * | 6/2000 | Huberman | 705/37 |
| 6,108,639 | A * | 8/2000 | Walker et al. | 705/26.2 |
| 6,151,589 | A * | 11/2000 | Aggarwal et al. | 705/36 R |
| 6,161,099 | A * | 12/2000 | Harrington et al. | 705/36 R |
| 6,167,386 | A * | 12/2000 | Brown | 705/37 |
| 6,202,051 | B1 * | 3/2001 | Woolston | 705/37 |
| 6,243,691 | B1 * | 6/2001 | Fisher et al. | 705/37 |
| 6,266,651 | B1 * | 7/2001 | Woolston | 705/26.3 |
| 6,266,652 | B1 * | 7/2001 | Godin et al. | 705/37 |
| 6,269,343 | B1 * | 7/2001 | Pallakoff | 705/26.2 |
| 6,272,472 | B1 | 8/2001 | Danneels et al. | |
| 6,272,473 | B1 * | 8/2001 | Sandholm | 705/37 |
| 6,272,474 | B1 * | 8/2001 | Garcia | 705/36 R |
| 6,285,989 | B1 * | 9/2001 | Shoham | 705/37 |
| 6,324,519 | B1 * | 11/2001 | Eldering | 705/14.66 |
| 6,343,273 | B1 * | 1/2002 | Nahan et al. | 705/5 |
| 6,343,277 | B1 * | 1/2002 | Gaus et al. | 705/37 |
| 6,366,891 | B1 * | 4/2002 | Feinberg | 705/37 |
| 6,385,317 | B1 | 5/2002 | Rix et al. | |
| 6,415,269 | B1 * | 7/2002 | Dinwoodie | 705/36 R |
| 6,415,320 | B1 * | 7/2002 | Hess et al. | 709/219 |
| 6,449,601 | B1 * | 9/2002 | Friedland et al. | 705/37 |
| 6,606,607 | B1 * | 8/2003 | Martin et al. | 705/37 |
| 6,813,612 | B1 | 11/2004 | Rabenold et al. | |
| 7,076,460 | B2 | 7/2006 | Dinwoodie | |
| 7,162,446 | B1 | 1/2007 | Handler | |
| 7,171,553 | B2 | 1/2007 | Rix et al. | |
| 7,716,090 | B1 | 5/2010 | Rabenold et al. | |
| 7,797,222 | B2 | 9/2010 | Levy | |
| 7,840,472 | B1 | 11/2010 | Levy | |
| 8,527,392 | B2 | 9/2013 | Levy | |
| 2002/0007338 | A1 * | 1/2002 | Do | 705/37 |
| 2002/0032631 | A1 * | 3/2002 | Rose | 705/37 |
| 2002/0138847 | A1 * | 9/2002 | Abrams et al. | 725/105 |
| 2002/0165817 | A1 * | 11/2002 | Rackson et al. | 705/37 |
| 2003/0046186 | A1 * | 3/2003 | Wren | 705/27 |
| 2013/0033917 | A1 | 2/2013 | Shen et al. | |

OTHER PUBLICATIONS

RealAudio: "MediaOne licenses RealNetworks' RealSystem 5.0 to deliver streaming medio to MediaOne Express customer," PR Newswire, Dec. 11, 1997, Proquest #25686644, 3pgs.*

Cutts, D.J. "DVB Conditional Access" Electronics and Communication engineering Journal, Feb. 1, 1997, pp. 21-27, vol. 9, No. 1.

Wright, D.T. "Conditional Access Broadcasting: Datacare 2. An oOver-Air Enabled System for General Purpose Data Channels" BBC Research and Development Report, Aug. 1, 1988, pp. 1-18, No. 10.

Buer, M. et al. "Integrated Security for Digital Video Broadcast" IEEE Transaction on Consumer Electronics, Aug. 1, 1996, pp. 500-5032, vol. 42, No. 3.

* cited by examiner

LIVE AUCTION PARTICIPATION UTILIZING A COUPLED BIDDING DEVICE

CROSS-REFERENCE TO RELATED APPLICATIONS

This application is a continuation of the United States patent application that was filed on Feb. 28, 2013 and assigned Ser. No. 13/781,693, which application is a continuation-in-part of the U.S. patent application Ser. No. 12/685,647 that was filed on Jan. 11, 2010 and issued as U.S. Pat. No. 8,412,587 on Apr. 2, 1013, which application is a continuation of the U.S. patent application Ser. No. 11/164,796 filed on Dec. 6, 2005 and issued on Feb. 16, 2000 as U.S. Pat. No. 7,664,677, which is a continuation-in-part of U.S. patent application Ser. No. 10/913,886 filed on Aug. 6, 2004 and issued on May 11, 2010 as U.S. Pat. No. 7,716,090, which is a continuation of U.S. patent application Ser. No. 09/866,191 filed on May 25, 2001 and issued as U.S. Pat. No. 6,813,612 on Nov. 2, 2004, which claims benefit of the filing date of U.S. provisional application for patent having been assigned Ser. No. 60/207,030, and filed on May 25, 2000. Each of these documents is herein incorporated by reference in its entirety and, the claims of the present application are fully supported within the specification of the U.S. Pat. No. 6,813,612.

BACKGROUND OF THE INVENTION

The present invention relates to the field of converging real-life events and remote access through network communications and, more particularly, to enabling remote audiences to participate in single and/or multiple-simultaneous traditional live auctions in a manner that allows the user to sensually experience the auction remotely without experiencing instantaneously interact with and enjoy the emotion and enthusiasm of a traditional, live auction (i.e., view items for sale, view live bidding, hear the auctioneer calling bids, view the activities of the onsite participants, make bids, buy items) from a position that is physically remote from the live auction, as well as network-only based-only auctions.

The auction floor is typically an exciting and emotionally charged environment. Whether the auction is focused on selling automobiles, items of fine art, construction equipment or the like, there is nothing that compares to standing in the crowd of bidders, listing to the chatter of the auctioneers, the yippers and the shouts of the bidders. In addition, the auction floor allows for the potential bidders to inspect the vast array of products to be auctioned by kicking the tires of an automobile, feeling the smoothness of a precious vase, listening to the roar of a diesel engine and otherwise developing a fondness for the object of their bidding efforts. However, in today's fast paced world, the advantages of participating in a live auction from a remote location are exceedingly evident. Prior to systems such as the one patented by Auction Management Solutions in U.S. Pat. No. 6,813,612, a company seeking to acquire products had to send one or more representative to the various auctions. Not only was this burdensome on overhead, such as having to hire sufficient personnel to attend the auctions and pay the travel expenses, but the companies also had to train the individuals so that they would be efficient at identifying products that were beneficial to the company as well as being effective and smart bidders. With the remote capabilities introduced by Auction Management Solutions, remote bidders are able to participate in a live auction from the comfort of their office with little or no disadvantage over the bidders that are present on the auction floor. The remote bidders can review the products and inspection information about the products, bid on the items in a competitive manner, and experience the excitement of the auction floor through audio and video feeds that are delivered to the remote bidder.

Typically, auction houses are set up to handle multiple auctions. As such, several auctions can be active at any given time for a single auction house. Traditionally, a company interested in acquiring multiple products to be auctioned in different auctions at a single auction house would be required to send multiple representatives to assure that the various auctions were covered. In many auction houses, the multiple auctions are conducted in what is referred to as lanes. As such, product traverses through one of the multiple lanes and bidders bid on the current item being auctioned in a particular lane. In the most favorable circumstance, a single person would only be able to cover two adjacent lanes for items that are being auctioned simultaneously. More typical, a single bidder would be required to run from one lane to the next in an effort to cover as many auctions as possible. However, it is clear that variances in scheduling and conducting the various auctions, coupled with the crowds attending the auction, can make it exceedingly difficult for a single individual to adequately cover an auctioning house. This problem is even more exasperated when auctions are being conducted at geographically dispersed auction houses. For a remote bidder using a system such as Auction Management Solutions' ONLINE RINGMAN, the entire auction house can be traversed simply by changing the auction or auction lane in which the bidder is bidding. Yet, even using such a solution, the remote bidder can only monitor and participate in a single auction at a time. Thus, there is a need in the art for an improved system that allows a single bidder to participate in multiple remote auctions in a simultaneous manner.

Often times, a company will hire a broker buyer or dealer representative to purchase assets on the company's behalf. Such broker buyers may typically be purchasing assets for multiple companies or dealers at a single auction or at multiple auctions. Such individuals need to monitor and bid in several auctions simultaneously. In addition, the broker buyer needs a mechanism to track which products are being purchased for which dealers or companies. To maximize or improve the efficiency and profitability of a broker buyer, it would be advantageous to operate in a remote mode and to participate in multiple auctions simultaneously. More particularly, it would be advantageous for a single broker buyer to be able to adequately cover an entire auction house, monitor and participate in multiple-simultaneous auctions, and keep track of the dealer associated with the various assets acquired through the auction. Thus, there is a need in the art for a system that addresses the needs of a broker buyer.

A broker buyer serving multiple companies may also be required to implement various bidding strategies and company induced constraints during the auctioning process. As such, the broker buyer must maintain an awareness of what company he or she is currently engaged in a bidding battle for and ensure that those bidding strategies and constraints are employed. This can be quite burdensome on a broker buyer and can easily subject the broker buyer to committing errors. Thus, there is a need in the art for a system that alleviates this burden on a broker buyer.

BRIEF SUMMARY OF THE INVENTION

The present invention provides improvements to Auction Management Solutions ONLINE RINGMAN system that allows for prospective auction bidders to participate both in person as well as in a remote capacity, but can be equally applied in other similar systems. The present invention enables an individual to remotely participate in a live auction (e.g., via the Internet or some other global or wide area network), sharing the same emotion and enthusiasm as the local audience, participating in the bidding process with negligible or no disadvantage just as if those physically remote bidders were sitting in the local auction audience, and to monitor and participate in multiple auctioning events regardless of whether the multiple auctioning events occur simultaneously, consecutively, or are time-wise and spatially separated. However, it should be appreciated that various aspects and features of the present invention may equally be applied in a completely online auctioning system that is not associated with a live auction floor in any manner.

One aspect of the present invention is the ability to display multiple bidding screens with each bidding screen representing a presently active auction in either a docked state or an active state. The active state bidding windows provide greater detail and control than the docked bidding windows, and also enable the highest quality audio and video feeds. However, advantageously the docked bidding windows allow a remote bidder to still monitor and participate in other auctions at the same time.

Another aspect of the present invention is to allow for the association of a customer-identifier with one or more of the bidding windows. This feature advantageously allows for purchased items to be associated with a particular customer, as well as providing a mechanism to automate and control the bidding process in a customer-centric manner. Thus, a remote bidder participating in multiple auctions in a simultaneous manner can rest assured that the items purchased through the various auctions will be earmarked for particular customers, and that specific bidding strategies, constraints and desires of a particular customer can be automatically or at least encouraged to be incorporated into the bidder's activity.

One embodiment of the present invention is a method for enabling a remote bidder to actively participate in and monitor multiple simultaneous auctioning events using a single bidding device. An active bidding window associated with a first auctioning event is displayed on the bidding device. The active bidding window includes a high-level of detailed information regarding the first auctioning event and includes a bidding button that can be selected or actuated by the remote bidder.

A docked bidding window associated with a second auctioning event is also displayed on the bidding device. The first docked bidding window includes a lower level of detailed information regarding the second auctioning event and includes a bidding button or actuator. In operation, the bidding device receives an actuation of the active bidding window bidding actuator and forwards a signal to a bid processing system managing the first auctioning event. In addition, the bidding device can receive status information from the bid processing system managing the first auctioning event and displaying the status information in the active bidding window.

The bidding device is also able to receive an actuation of the first docked bidding window bidding actuator and similarly forwards a signal to a bid processing system managing the second auctioning event, as well as receive status information from the bid processing system.

In some embodiments, the bidding device may receive an audio feed that is associated with the auction represented in the active state bidding window and then deliver this audio signal to the remote bidder.

Embodiments of the present invention may also include the ability for the bidding device to receive customer-identification selections for one or more of the bidding windows. Based on the value of the customer-identification selection, the bidding activity associated with a particular window can be marked as associated with a particular customer as well as be controlled in a manner desired by the particular customer.

The active and docked windows may include various active controls that can be actuated and invoke actions on the bid processing system regardless of the current state of the bidding widow. Thus, without having to activate a bidding window and turn on the audio while killing the audio for another auctioning event, the remote bidder can actually actively participate in a bidding battle in a docked bidding window.

In an exemplary embodiment of the present invention, audio and video may only be provided for active bidding screens. In another embodiment, audio may only be provided for active bidding screens but, video may be provided to all bidding screens, either at the same quality level or at a reduced quality level for docked bidding screens.

Another aspect of the present invention is to enable the remote bidder to change the state of a bidding window from an active state to a docked state, and visa versa as desired and/or acquired. In addition, mechanisms and rules can be employed within the bidding device to automatically change the state of a bidding window or at a minimum, prompt the remote bidder regarding important information that may suggest to the remote bidder that he or she needs to change the state of a bidding window.

DETAILED DESCRIPTION OF THE INVENTION

The present invention provides improvements in online-auctioning capabilities for both integrated on-line and traditional style auctions, and completely on-line type auctions. One aspect of the present invention is the provision of a multi-windowed environment that allows for the display of active bidding windows and docked bidding windows. The active bidding window(s) is a fully functional bidding window including auction status, product information and the like. The docked bidding windows provide a subset of the information but, nonetheless provide real-time auction status information and allows for bidders to enter bids into the auctioning process without having to move the bidding window into an active status. Another aspect of the present invention is utilizing a customer-identifier that can be selected by a remote bidder and associated with a particular bidding window. The customer-identifier advantageously helps the remote bidder to track who purchased items are associated with, as well as providing control structure over the bidding process.

Turning now to the figures, various embodiments, aspects and features of the present invention will be described.

Figure 1:
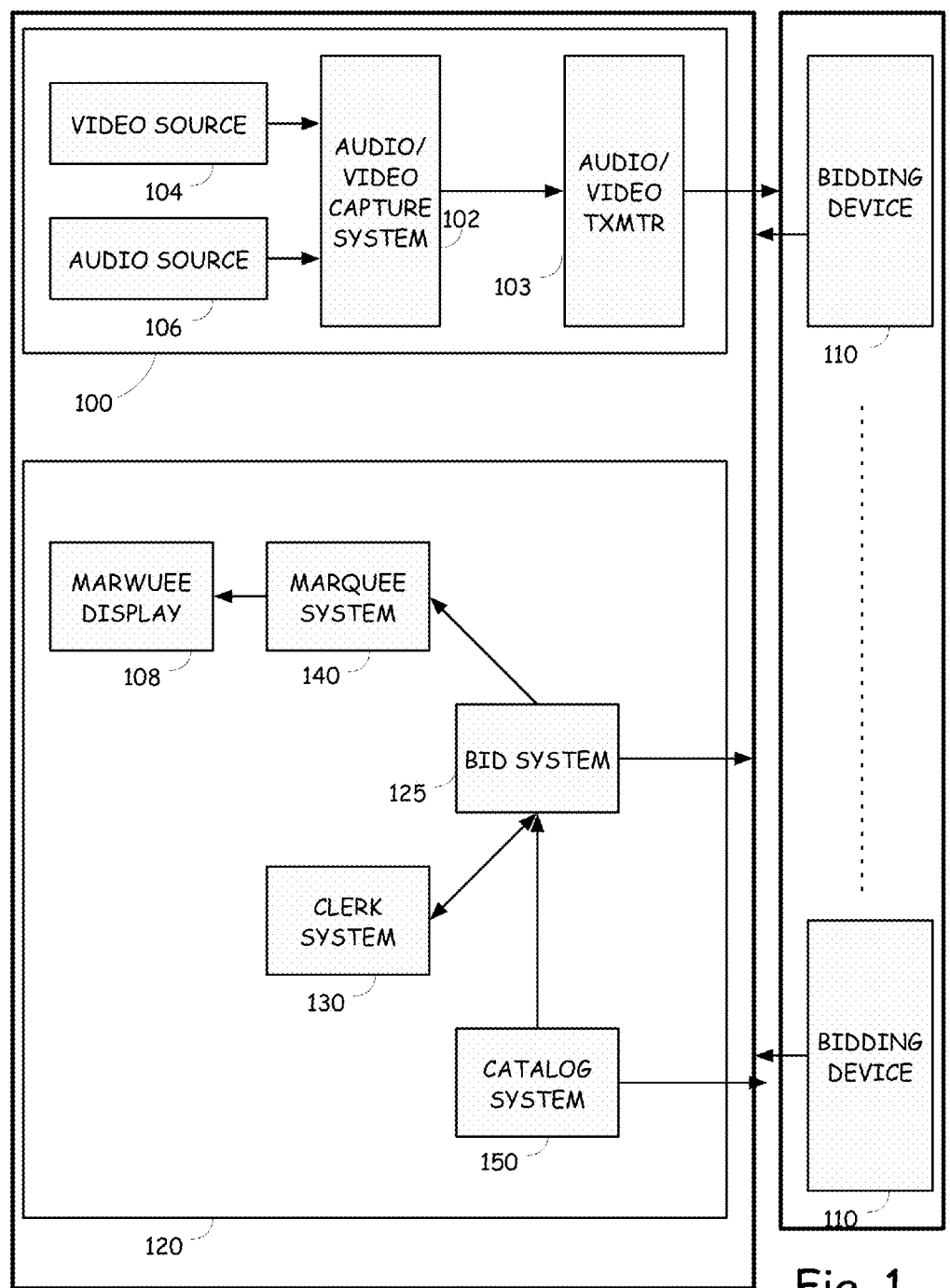
FIG. 1 is a block diagram of an exemplary environment suitable for various embodiments of the present invention.

FIG. 1 is a block diagram of an exemplary environment suitable for various embodiments of the present invention. In the illustrated environment, the system includes:

An audio/video system 100 for delivering live audio and video feeds from the auction floor to the remote bidders;

One or more bidding devices 110 used by the remotely participating bidders to, among other things, monitor various auctions, bid on various items and render the audio and video information to the bidder; and A bid processing system 120 that operates to control the interaction among the remote bidders, a clerk and/or an auctioneer and the local bidders attending the auction.

In an exemplary embodiment, the audio/video system 100 includes a video source 104, an audio source 106, an audio/video capture system 102, all of which are typically located at the auction site and an audio/video transmitter 103 to providing the audio and video signals to the one or more bidding devices 110. The audio/video system 100 operates to receive an audio and/or video stream from the audio/video capture system 102, provide the encapsulated data to the audio/video transmitter 103 and then to deliver this data to one or more bidder devices 110. The audio/video capture system 102, which can be implemented in a variety of manners, one of which may consist of suitable hardware cards installed in a computer system, encapsulates the audio/video stream from the auction floor. The audio/video capture system 102 obtains the audio and/or video streams by interfacing to the audio source 106 and/or the video source 104. The audio/video system 100 operates to gather this audio and/or video data and transmit or broadcast the data in an appropriate format to one or more of the bidder devices 110. Further details of one embodiment of the audio/video system 100 can be found in U.S. Pat. No. 6,813,612; however, it will be appreciated that many other embodiments can be utilized in various implementations of the present invention and in addition, aspects and features of the present invention may be incorporated into a system that does not provide audio, video or both.

The bid processing system 120 may take on a variety of embodiments, such as those disclosed in U.S. Pat. No. 6,813,612, and/or encapsulated in the ONLINE RINGMAN system developed and marketed by Auction Management Solutions of Tampa Fla., as well as other similar systems. For illustrative purposes, a non-limiting example of a suitable bid processing system 120 may include a bid system 125 and a clerk system 130. Data for an item to be sold in the auction can be extracted from a catalog system 150 that maintains the pre-sales information prior to the auction start, and transferred to the bid system 125, and broadcast to various bidder devices 110 and/or to a marquee system 140 to be displayed on a marquee display device 108 located on the auction floor as the items are auctioned. Alternatively or in addition, the bidding devices 110 may interface directly to the catalog system 150 to obtain such information. A starting bid is established on the clerk system 130 either based on the pre-sales information, by the auctioneer or by the clerk, and then bids are accepted from floor or remote bidders. Status pertaining to the bidding process, such as bids placed, identity of bidding participants, bid acceptance, etc. may be transmitted to the marquee system 140 and/or the bidder devices 110, and logs can be maintained identifying activity including status of each bid made by a remote bidder or local bidder. The bid system 125 may include a "bid engine" algorithm to facilitate controlling the bidding process. The bid engine can be implemented to support one or more of the bidding models that function to control the bidding process. The various bidding models can be used to define the level of automation in the bidding process (i.e., whether the auctioneer is in total control of all aspects of the bidding process or if some of the functions are performed automatically outside of the auctioneers control), the bid increments, the ability to enter starting bids, display formats, etc. U.S. Pat. No. 6,813,612 defines four specific bidding models identified as the CHEROKEE, IROQUOIS, MOHAWK and APACHE models, however, other bidding models may also be utilized in conjunction with the various aspects and features of the present invention.

A detailed embodiment of an exemplary bidding device 110 is more fully described in U.S. Pat. No. 6,813,612, however, it should be appreciated that various aspects and features of the present invention can be realized in other embodiments of a bidding device. Basically, for various embodiments of the present invention, the bidding device simply needs to include a display, a user input interface, a bid processing system interface, a processing unit for executing a software or firmware process implementing the various steps involved in present invention and optionally an audio output interface. Thus, the bidding device may be a stand alone computer, a networked computer, a laptop computer, a tablet computer, a smart phone, a custom handheld portable device, a software application that can be downloaded onto a computer or portable device, such as a smart phone, etc.

Aspects of the present invention can be implemented using a variety of hardware platforms, software languages and programming environments. Those skilled in the art will readily observe that implementing the present invention in various environments will naturally require the use of various technologies. However, the present invention is not limited to any particular division of hardware/software functionality, hardware components, software languages, or programming techniques. Thus, references within this description identifying design particulars, although in and of themselves may be considered novel and inventive, are provided only for illustrative purposes and should not be construed to limit the present invention but rather are additive.

As is more fully described in U.S. Pat. No. 6,813,612, but described here in general, the various display components of an exemplary system (i.e., the bidding devices 110, the marquee 140 and/or the clerk system 130) can be connected or communicatively coupled to the system through a network, with each component including a unique network address which is identified during a login process. Once the login process is complete, the particular component is linked to that network address. At that point, the display component is "tied in" to the system and can start receiving data to be displayed. One aspect of the invention in the U.S. Pat. No. 6,813,612 is the provision of a base display that is sent to the display component once the component is tied in to the system. The base display may contain a background frame with dynamic display areas remaining blank. Advantageously, this reduces the size of the data packets required when an operator/system action is taken during the normal system operation. From this point forward, small data packets are sent to specific cursor addresses on the appropriate display. For example, when a floor bid is entered in the bid processing system 110, data packets can be sent to various display devices for updating the status of the auction, for instance, the marquee system may be updated with the specific bid amount and bidder #, the bidder device 110 can be updated by providing new values to the bid buttons and the clerk system 130 can be updated by providing new bid increments and a log message.

Another factor that is described in the U.S. Pat. No. 6,813, 612 is the ability to reduce the update time required for display changes by broadcasting the same data to all systems connected to a particular network address, primarily the bidder devices 110. Each system performing a particular function receives the same data at the same time from the bid processing system's 120 perspective. The only delay in receipt of the information from the bid processing system 120 is the inherent delay in the distance and method of the transmission over their respective communication links.

Although the various embodiments of the present invention may be described with reference to a particular network structure, those skilled in the art will appreciate that various network structures could be utilized in various implementations of the present invention. Thus, the various components may be connected through standard TCP/IP internet technology, as well as other technology including Ethernet, direct connections, wireless networking, etc. or any combination or hybrid of various communication technologies.

Figure 2A:
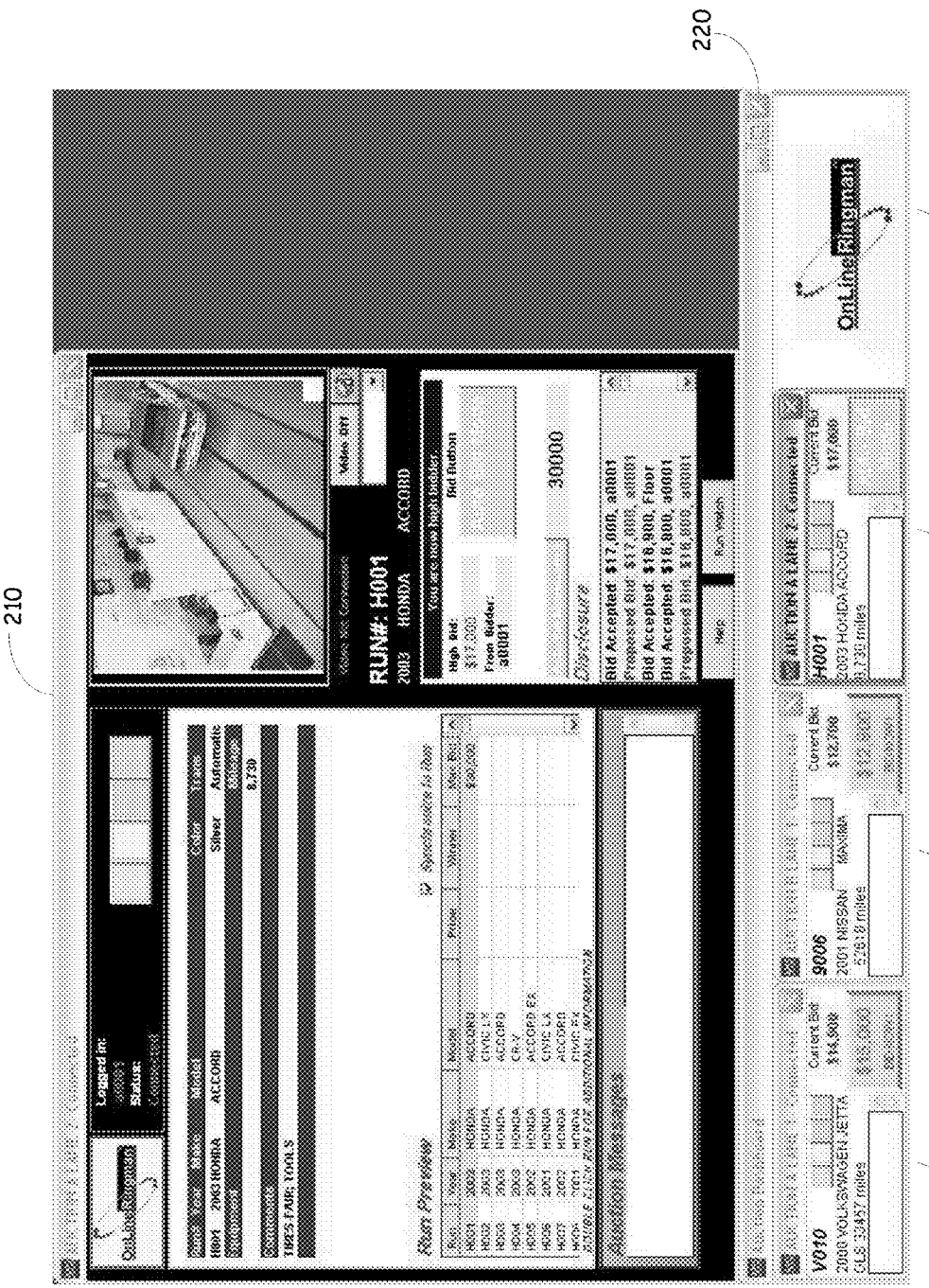
FIG. 2A is a screen shot of an exemplary display for a bidding device incorporating an embodiment of the multiple bidding window aspect of the present invention.
Figure 2B:
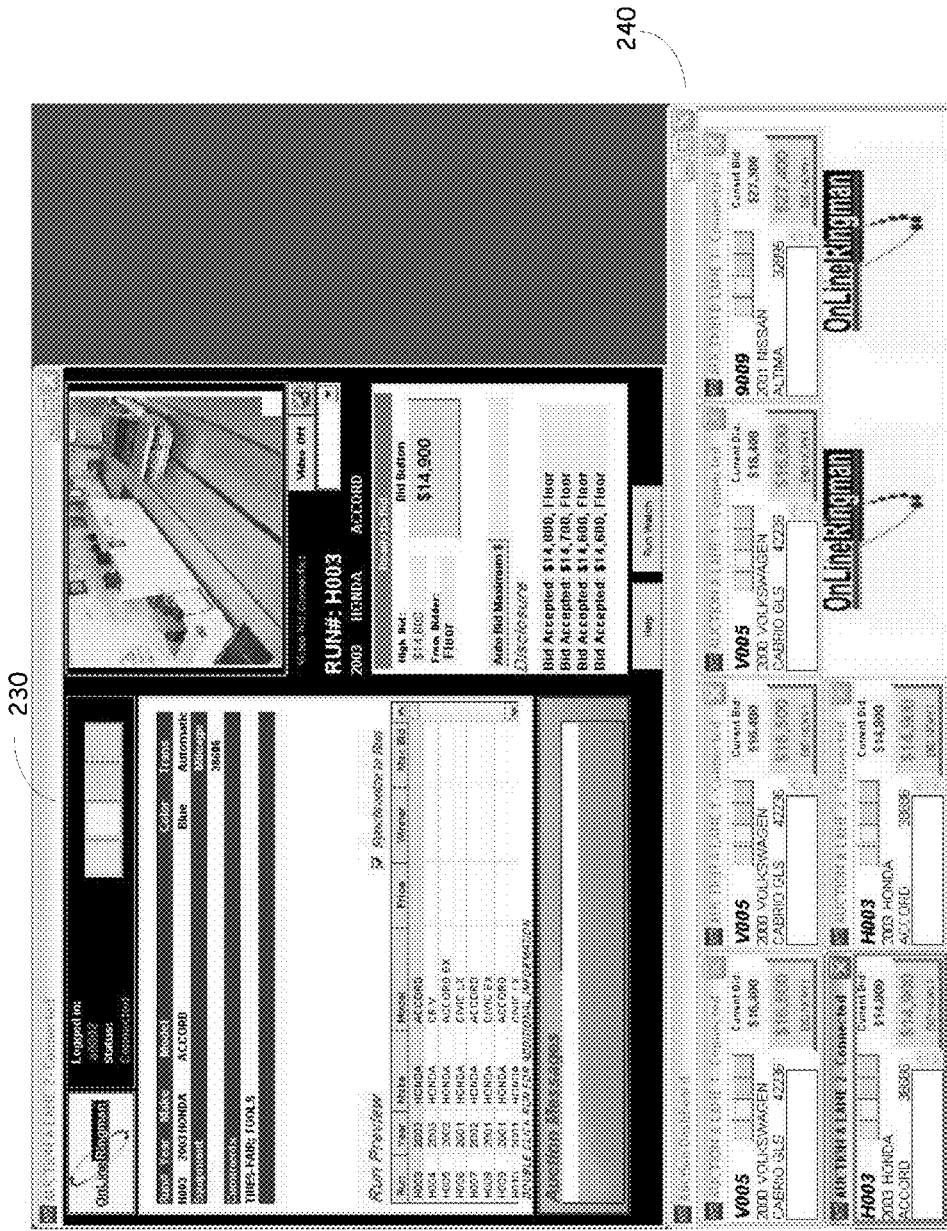
FIG. 2B is a screen shot of an exemplary display that includes a dashboard section that has been resized to hold 6 mini-bidding screens.

One aspect of the present invention is the ability for a remote bidder to simultaneously participate in the independent auctioning of multiple items. This aspect of the present invention includes a heightened requirement on the provision of the display data in that a significantly larger amount of data must be delivered by the bid processing system, the audio/video system and the catalog system. FIG. 2A is a screen shot of an exemplary display for a bidding device 110 incorporating an embodiment of this aspect of the present invention. The display screen includes a main bidding screen 210 and a dashboard section 220 for one or more docked mini-bidding screens 221-223 and a vacant dock 224. It should be appreciated that the particular arrangements of the items in the display, although potentially novel and inventive in and of themselves, are not provided as a limiting example of this aspect of the present invention. Various features that can be incorporated into this aspect of the present invention include the ability to customize the display sizes for the main bidding screen 210 and the dashboard section 220. In one embodiment, the standard sized dashboard can display a total of four mini-bidding screens. Additional auctions beyond the four displayed can be initiated and docked into the dashboard but the user will need to resize the dashboard to see the additional mini-bidding screens. Various mechanisms for defining and/or adjusting the size of the dashboard screen can be employed, such as using the standard MICROSOFT WINDOWS controls of clicking and dragging on the top, bottom, sides or corners of the window. Alternatively, other techniques, such as horizontal and/or vertical scroll bars may be used to gain access to additional mini-bidding screens or the screen sizes and ratios can be changed and adjusted automatically as additional bidding windows are opened. FIG. 2B is a screen shot of an exemplary display that includes a dashboard section 240 that has been resized to provide place holders for 8 mini-bidding screens, 6 of which are occupied. The main bidding screen 240 has been reduced to accommodate the increased window size for the dashboard section.

Figure 3:
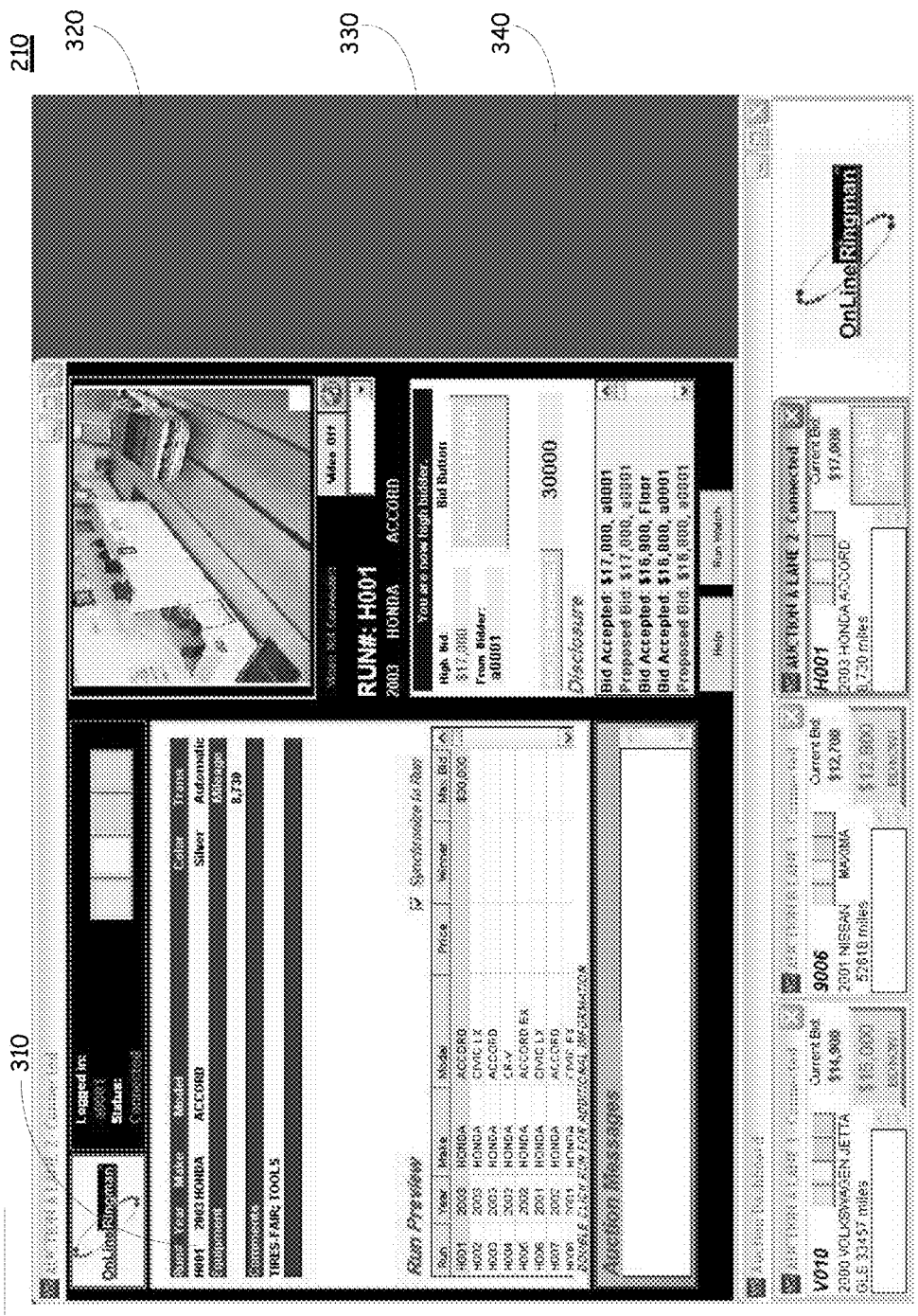
FIG. 3 is an enlarged view of an exemplary embodiment of the active or main bidding screen.

FIG. 3 is an enlarged view of an exemplary embodiment of the active or main bidding screen 210. It should be appreciated that the example presented is for illustrative purposes only and although the presented screen may include novel and inventive elements, the presently described aspect of the present invention is not limited to the presented embodiment. The main bidding screen displays the active auction with live audio and video. The illustrated main bidding screen 210 includes an item description section 310 that includes information about the item presently up for auction as well as a listing of upcoming items. The main screen also includes a video section 320 that provides a rendering of the video feed from the auction floor and an audio enable/disable button 330. An activity or status section 340 is used to provide updated information to the remote bidder as well as action buttons so that the remote bidder can enter bids, request information, etc.

Figure 4:
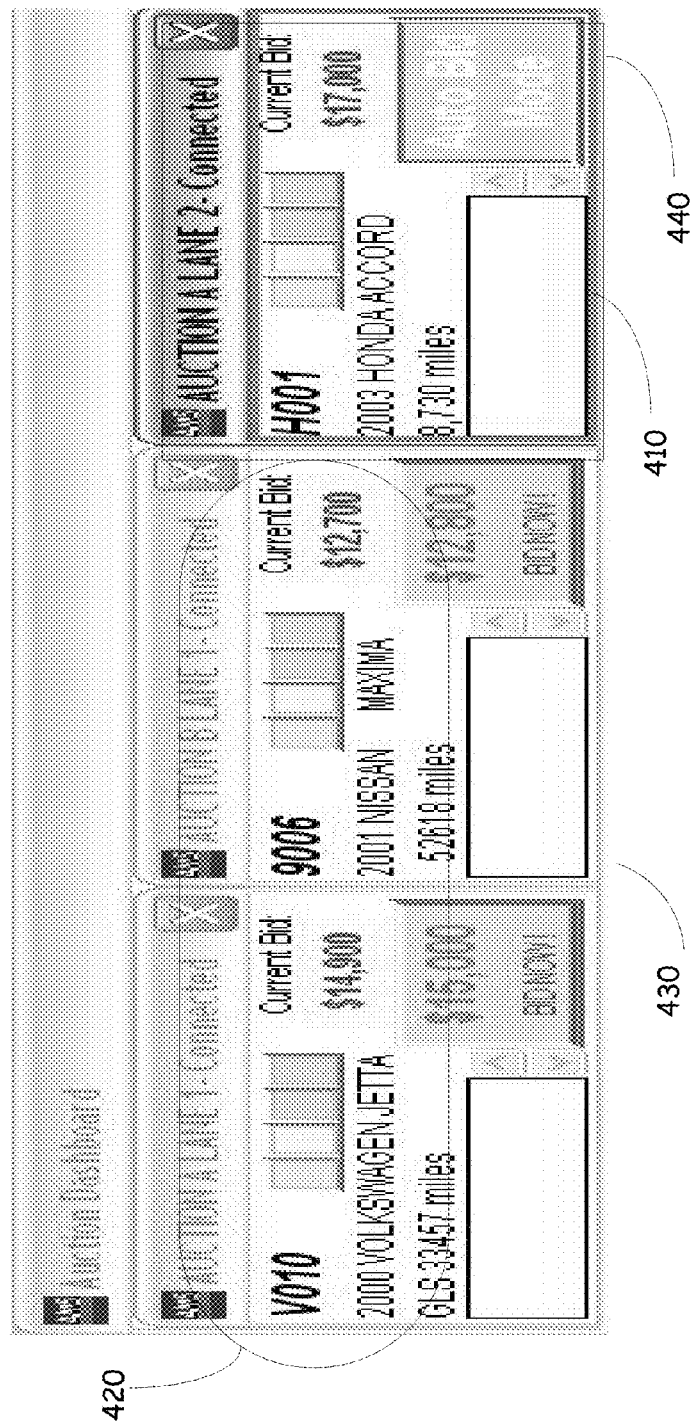
FIG. 4 is an enlarged screen shot of an exemplary embodiment of a mini-bidding screen.

FIG. 4 is an enlarged screen shot of an exemplary embodiment of a mini-bidding screen. The mini-bidding screen illustrated in FIG. 4 includes an information area 420 that includes at least some of the information that could be displayed in the main bidding window, a messaging section 430 that allows the remote bidder to receive and/or submit text messages to the auctioneer or a clerk, and a control/status area 440 that allows the remote bidder to watch the action taking place in the particular auction as well as place bids in the auction directly using the mini-bidding screen without having to switch from the active auction. It should be appreciated that the illustrated embodiment, although it may be novel and inventive in and of itself, is not the only embodiment suitable for the present invention. For instance, rather than using the described dashboard arrangement, the user may be allowed to open several windows similar to the main bidding screen with each window focusing on a particular auction event (i.e., the operations taking place in a single auction lane, a specific auction, or an auctioning of a specific item). The windows can be tiled, cascaded or otherwise arranged on the user's computer screen. In one embodiment, a single window can be selected as active, and thus able to receive the audio and video streams. In other embodiments, multiple windows can be active, with each receiving the audio and/or video streams. In such an embodiment, the user may be able to mute the audio from particular auctions simply be selecting an audio on/off toggle button similar to button 330 in FIG. 3 while maintaining the video feeds. In other embodiments, the mini-bidding screens may be adjusted to include more or less information than the main bidding screen, may include the exact information as the main bidding screen but reformatted or reduced in size, or may be otherwise configured. Additionally, the delivery of video may be available for both the docked and the active bidding windows. In one embodiment, each of the windows may receive the full extent of the available video. In other embodiments, the docked bidding windows may receive video at a slower rate than the active bidding window(s), or simply a single still picture of the item being auctioned or even no video elements at all.

Figure 5:
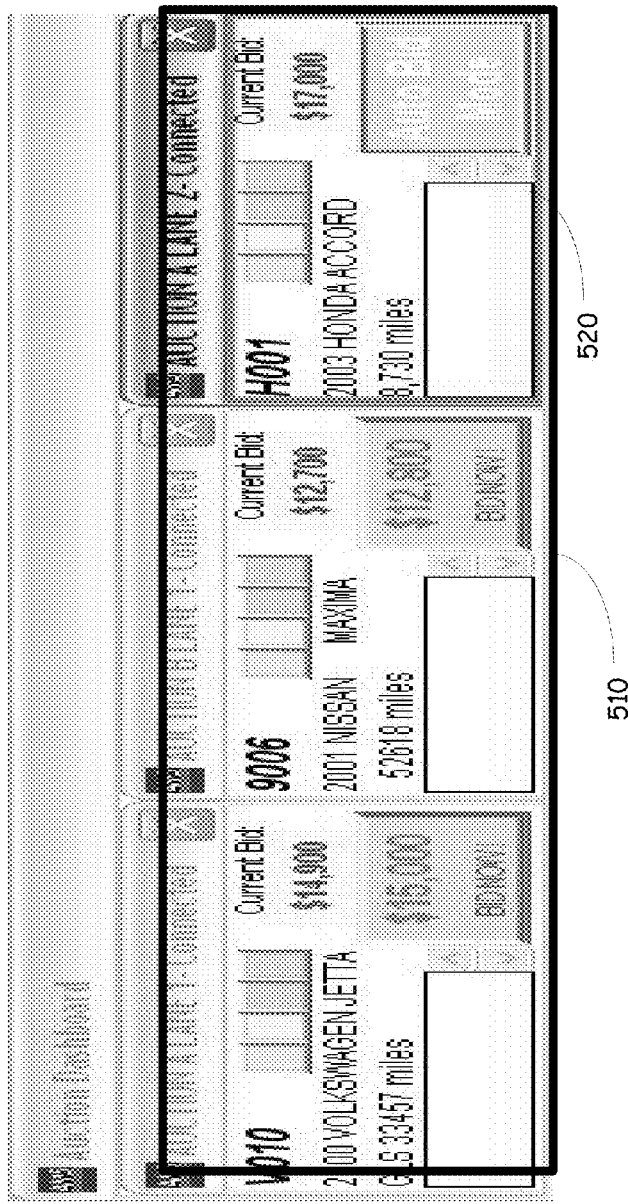
FIG. 5 is an enlarged screen shot of an exemplary embodiment of a mini-bidding screen that is associated with an active or main bidding screen and that is shown as residing in an auto bid mode.

Focusing on the embodiment that includes a main bidding screen and one or more mini-bidding screens docked on the dashboard, the user may change which auction is displayed in the main bidding screen by performing a selection action. Non-limiting examples of selection actions may include clicking on the title bar of the mini-bidding window, clicking on a non-control element portion of the mini-bidding window or using a minimize/maximize button similar to what is provided in a WINDOWS environment. In some embodiments, the dashboard may include a mini-bidding screen associated with the active or main bidding screen 210 as well. In such an embodiment, the mini-bidding window associated with the active or main bidding screen 210 can be high-lighted by including a colored or darkened boarder, using a different color scheme or using other differentiating mechanisms. FIG. 5 is an enlarged screen shot of an exemplary embodiment of a mini-bidding screen that is associated with an active or main bidding screen and that is shown as residing in an auto bid mode. In this embodiment, the fact that the mini-bidding screen is associated with the main bidding screen is indicated by providing a dark solid border 510 around the mini-bidding window. The indication of the auto bid mode illustrates that the various bidding window can operate in different bidding modes.

In another embodiment of the present invention, switching the state of the various bidding windows can be automated or semi-automated by applying certain rules or detecting certain events. For instance, if a remote bidder is actively participating in an auction displayed in an active bidding window, if the current bid exceeds a threshold amount, such as the maximum amount a dealer is willing to pay for a particular item, the active bidding screen could automatically be switched to the docked status. Similarly, a docked bidding screen may be switched to the active state to accommodate the transition of a currently active state bidding window to the docked state, or based on other rules and events. As a non-limiting example, a docked bidding screen may be automatically switched to an active state when a certain item is introduced to the bidding floor. Other events or rules that can be applied include, but are not limited to, switching a docked bidding window to the active state when bidding activity is slowed down, a particular bidder is identified as participating in the auction, a particular bidder is not participating in the auction, a minimum threshold bid is reached, an auto-bid value set by the remote bidder has been exceeded by another participant, the remote bidder ends up losing another bidding battle, or the like. As another example, a remote bidder may set up a schedule of particular items for which the bidder is interested. The bidding device 110 can be programmed to automatically change the states of bidding windows associated with items identified in the schedule as the items are introduced to the auction floor and/or as the bidding process terminates for these items. Those skilled in the art will appreciate that a variety of rules for automatically changing the states of the bidding windows can be identified and employed in this aspect of the present invention. In addition, rather than automatically changing the states of the various bidding windows, the bidding device can simply prompt the remote bidder of a particular event that may encourage the remote bidder to change the state of one or more bidding window.

It will also be appreciated that control mechanisms can be established that would allow the auctioneer, the bid processing system or a clerk to exert control over the state of the bidding windows currently open on a bidding device. For instance, if the auctioneer is aware that a particular remote bidder has shown an interest in a certain category of products, the auctioneer may cause a message to be sent to the bidding device for that remote bidder. The bidding device in turn can either prompt the remote bidder to change the state of a bidding window or automatically change the state of the bidding window.

Thus, it will be appreciated that the state of bidding windows can be changed in response to a selection indicator. The selection indicator can be an action by a remote bidder, the occurrence of an event, an action by an auctioneer or a bid processing system, a timer or other similar criteria.

In the embodiments illustrated in FIGS. 2-5, the bid buttons displayed in the various bidding screens (e.g. main bidding screen and mini-bidding screens) are active bid buttons. Thus, a remote bidder can bid on any of the docked mini-bidding screens, as well as the main bidding screen, at any time simply by clicking on the associated bid button. In the embodiment illustrated in FIG. 4, the active bid button 410 shows that the next available bid that can be entered is $12,800. Clicking on the bid button of an inactive mini-bidding screen will submit the bid but, will not cause that auction to become active (i.e., switch that auction to the main bidding screen—although it will be appreciated that the system could be configured to utilize such action as one that would result in switching the auction to the main bidding screen). In other embodiments, other control elements in addition to the bid button may also be defined. As a non-limiting example, a text message capability may be provided in the mini-bidding window that would allow the remote bidder to send a text message to the auctioneer or a clerk requesting pertinent information about the auction without requiring the remote bidder to select the pertinent auction to be the active auction.

In an implementation of this aspect of the present invention, the display information pertaining to the various auctions must be provided to the bidding devices 110. In addition, the bidding information and other actions of the remote bidders must be processed for the various auctions. It should be appreciated that a variety of system and design architectures can be utilized to satisfy these requirements. For instance, in one embodiment, a completely separate system similar to the system described in FIG. 1 (e.g., bid processing system and audio/video system) can be provided for each auction or each auction lane. In this embodiment, the separate systems will independently communicate with various bidding devices 110. The bidding devices 110 then must separate out the information from the various systems and display this information accordingly. In such an embodiment, all information provided from the various systems may include an identification tag that identifies the pertinent auction. Likewise, the bidding devices 110 must direct bid information and other requests to the appropriate bidding system.

In another embodiment of the present invention, a single master system may collect the information to be provided to the various bidding devices and to receive and process the bidding information provided by the bidding devices. Thus, each auction lane or auction could include an audio source, a video source and an interface to the auctioneer/clerk that all feed into the master system. It will be appreciated that those skilled in the art may identify other alternative architectures that can meet the technical requirements for implementing this aspect of the present invention without departing from the spirit and scope of this aspect of the invention.

Figure 6:
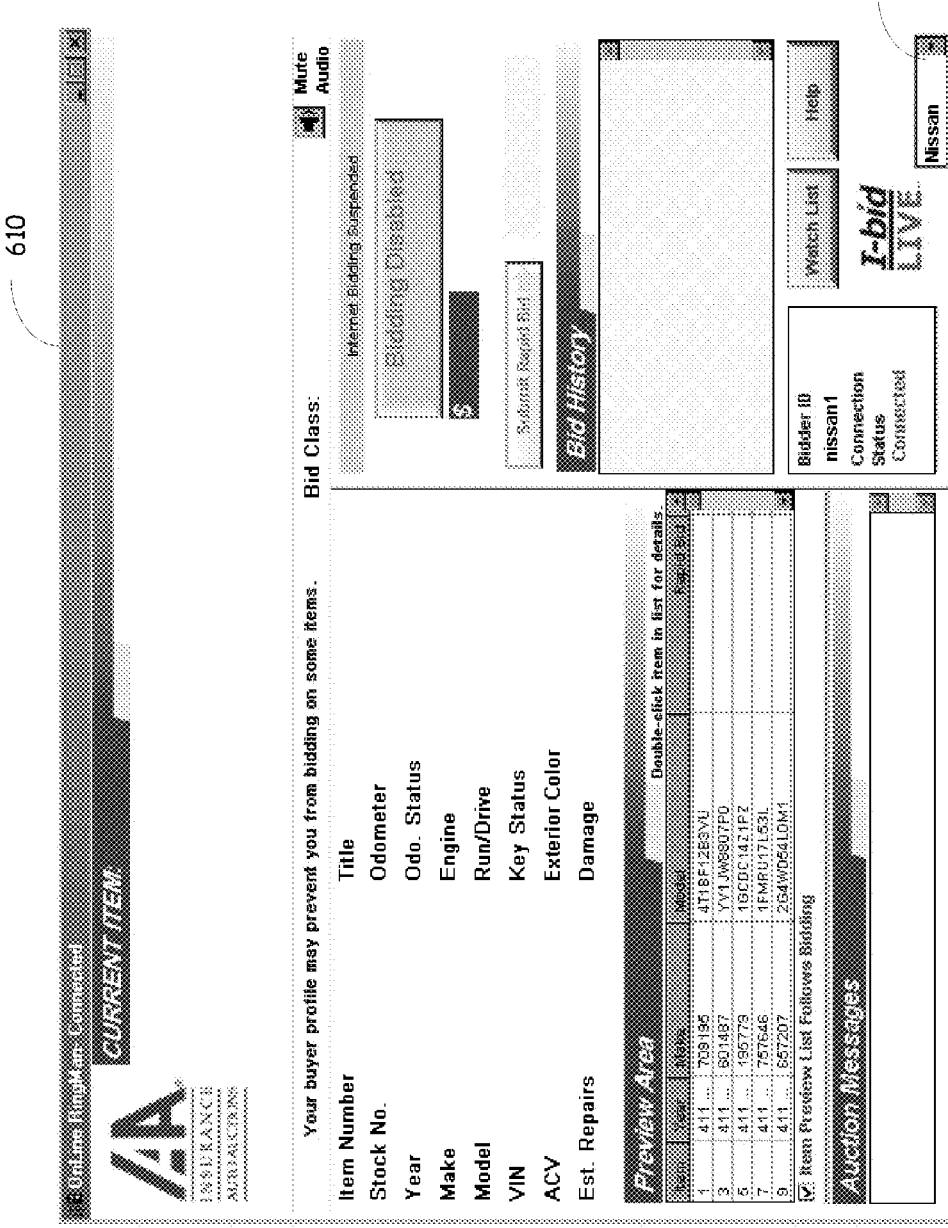
FIG. 6 is a screen shot of a main or active bidding window that includes an embodiment of the broker buyer tracking aspect of the present invention.

Another aspect of the present invention is providing tracking support for remote bidders, such as a broker buyer, to facilitate keeping track of the company, dealer or entity on whose behalf the broker buyer is bidding on the asset. FIG. 6 is a screen shot of a main or active bidding window 610 that includes an embodiment of the broker buyer tracking aspect of the present invention. In general, a broker buyer may operate to purchase assets at one or more auctions for multiple customers (i.e., dealers). With the fast pace of the auctioning environment, a broker buyer could find himself at the end of the day with a list of purchased assets and facing the task of sorting out which assets should be attributed to which customers. This aspect of the present invention alleviates this burden by allowing the remote bidder to identify the customer for which the assets are being purchased. In the illustrated embodiment, a pull-down menu is provided to allow the remote bidder to select the customer or dealer associated with the bidding for a particular item or auctioning event. In other embodiments, the remote bidder may be able to manually enter identification information rather than using a pull down menu. Once the selection is made by the remote bidder, this information can be provided to the bid processing system. The bid processing system can then generate a report at the end of an auctioning event identifying the bidder that won the auction and including the identification of the customer or dealer. Alternatively, the customer-identification information may be maintained within the bidding device which can then generate a report for the remote bidder indicating which items were won in the auctioning process and the customer identification for each such item.

In yet another embodiment, the selection or entering of identification information may not only be used to identify the customer for which an asset has been purchased, but may also be used to assert some control over the bidding process for the particular auctioning event or item being auctioned. For instance, a remote bidder may have customers with great variances in what they are willing pay for items, how many items they are interested in acquiring, bidding strategies that they want to utilize, etc. With this aspect of the present invention, once the remote bidder selects or identifies the customer associated with a particular auctioning event or the auctioning of a particular item, a database can be accessed to determine the particular bidding characteristics desired by that customer.

As a non-limiting example, customer A may set a cap at $18,000 for a particular class of item or a particular item, etc. Once the remote bidder selects customer A for an auction, the remote bidder does not have to keep track of such restrictions imposed by the customer. Rather, the bidding device can automatically stop bidding for items in the particular class for customer A once the maximum bid of $18,000 is reached.

As another non-limiting example, a single bidding screen may be associated with an auctioning event, wherein an auctioning event is defined as the activity occurring in a single lane for a given period of time. By selecting a particular customer, information can be retrieved by the bidding device to automate some or all of the bidding process for that auctioning event. The retrieved information may include the type of assets the customer is interested in, the type of assets the customer is not interested in, the top dollar the customer is willing to pay for a particular asset, the minimum bid that must be reached before bidding, the sequence of bid raising, bidding strategy, the preferred bid increments, etc. With such information, one can appreciate that the bidding device can assume significant work effort in the bidding process, thereby freeing the remote bidder to monitor and participate in more auctions.

Figure 7A:
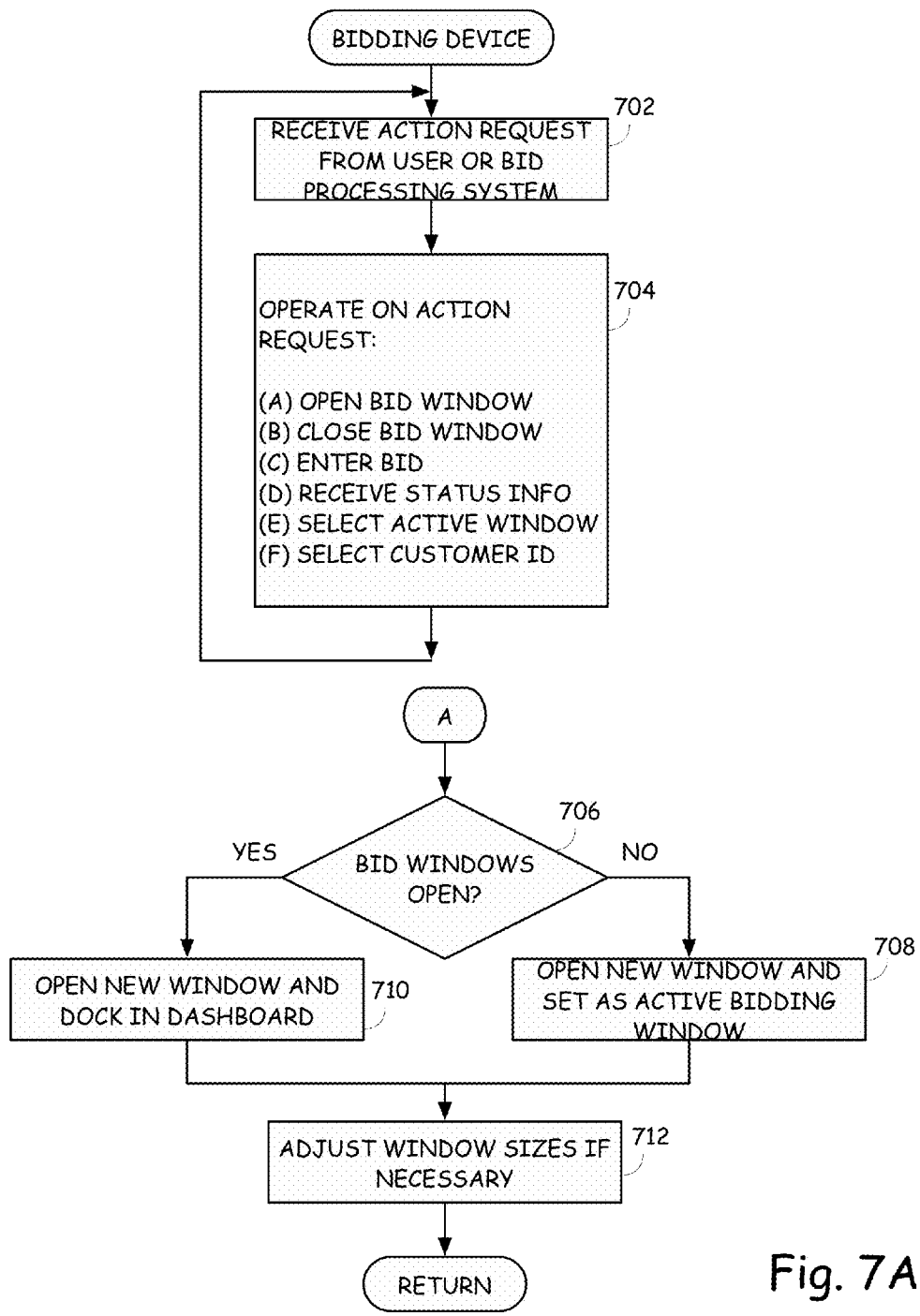
FIGS. 7A-7C are flow diagrams illustrating the operations involved in a particular embodiment of aspects of the present invention operating within a bidding device.
Figure 7B:
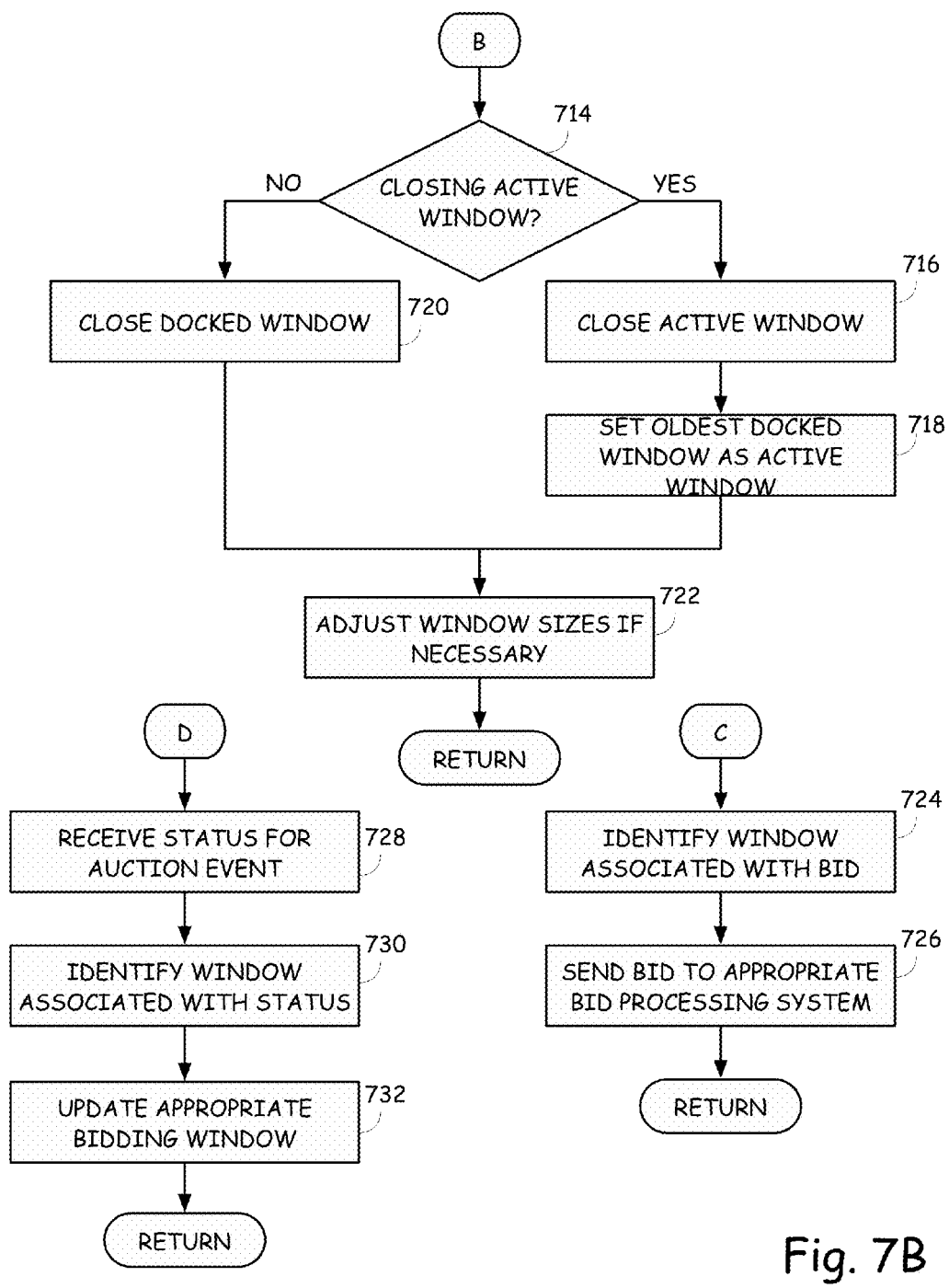
Figure 7C:
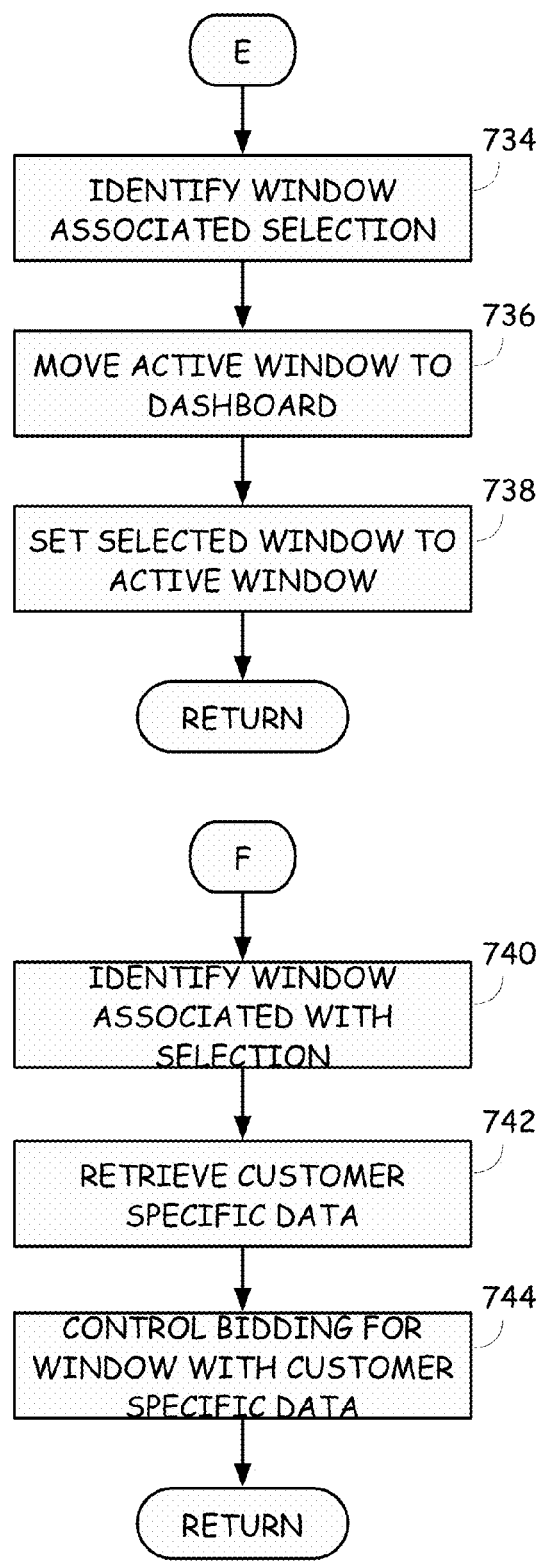

FIGS. 7A-7C are flow diagrams illustrating the operations involved in a particular embodiment of aspects of the present invention operating within a bidding device. At step 702, an action request from either a remote bidder or a bid processing system is received at the bidding device. The action request is analyzed at step 704 and appropriate actions are invoked.

If the action request is a request from a remote bidder to open a new bidding window, processing continues at point A in FIG. 7A. At step 706, the process determines if any bidding windows are open. If no bidding windows are open, processing continues at step 708 where a new bidding window is opened in response to the request and the new window is set as the active bidding window. If at step 706 it is determined that at least one bidding window has already been opened, processing continues at step 710 where a new bidding window is open and docked in the dashboard. It should be appreciated that other rules for determining which windows are opened in the active state versus the docked state can be applied. For instance, all windows can be opened in a docked state and later moved into an active state. Alternatively, the last bidding window opened may assume the active state with all previous bidding windows be placed into the docked state. In yet another embodiment, all windows may be opened in the active state and later moved into the docked state either upon an action by the remote bidder or based on other rules and event. After completion of either step 708 or 710, processing continues at step 712 where any window resize adjustments required to display the open windows are performed. Processing then returns to step 702 to await the next action request.

If the action request is a request from a remote bidder to close a bidding window, processing continues at point B in FIG. 7B. At step 714, the process determines if the closing window associated with the request is the active window. If the request is associated with an active window, processing continues at step 716 where the active window is closed and then to step 718 where one of the docked windows, such as the oldest docked window, is set to the active window. It will be appreciated that other rules for determining that state of other bidding windows may also be applied. Non-limiting examples include requiring the user to select a new active window, selecting a new active window based on previously established rules, or the like. If at step 714 the request is associated with a docked window, processing continues at step 720 where the docked window is closed. After either step 718 or step 720, processing continues at step 722 where any window resize adjustments required to display the open windows are performed. Processing then returns to step 702 to await the next action request.

If the action request is a request from a remote bidder to enter a bid, processing continues at point C in FIG. 7B. At step 724, the process determines the identity of the window associated with the bid. At step 726, the entered bid is sent to the appropriate bid processing system (the one associated with the bidding window) or to the bidding system with an indication of the particular auctioning event with which the bid is associated. It will be appreciated that this process can be performed for both the active bidding windows, as well as docked mini-bidding windows. Processing then returns to step 702 to await the next action request.

If the action is a status update received from the bid processing system, processing continues at point D in FIG. 7B. At step 728, the status for an auction event is received from the bid processing system. At step 730 the process determines the identity of the bidding window associated with the status information. Once this determination is made, the process updates the bidding window with the new status information. It will be appreciated that this process can be performed for both the active bidding windows, as well as docked mini-bidding windows. Processing then returns to step 702 to await the next action request.

If the action is a request from the remote bidder to select a new or additional active window, processing continues at point E in FIG. 7C. At step 734, the process determines the identity of the window associated with the selection request. At step 736, if the embodiment only supports one active bidding window, then the currently active bidding window is moved to the dashboard and then at step 738, the selected docked mini-bidding window is moved to the active window. In an alternative embodiment that allows for multiple bidding windows to be active and the threshold number of active bidding windows has not been met, then the selected docked mini-bidding window is simply moved to the active bidding window status. Processing then returns to step 702 to await the next action request.

If the action is a request from the remote bidder to select a customer-identification for a particular bidding window, processing continues at point F in FIG. 7C. At step 740 the process determines the identity of the bidding window associated with the customer-identification selection. At step 742, the customer specific data associated with the customer-identification is retrieved. At step 744, this information is then applied to control the bidding process associated with the bidding window or simply to associate the results of the bidding process with the particular customer. Processing then returns to step 702 to await the next action request.

Figure 8:
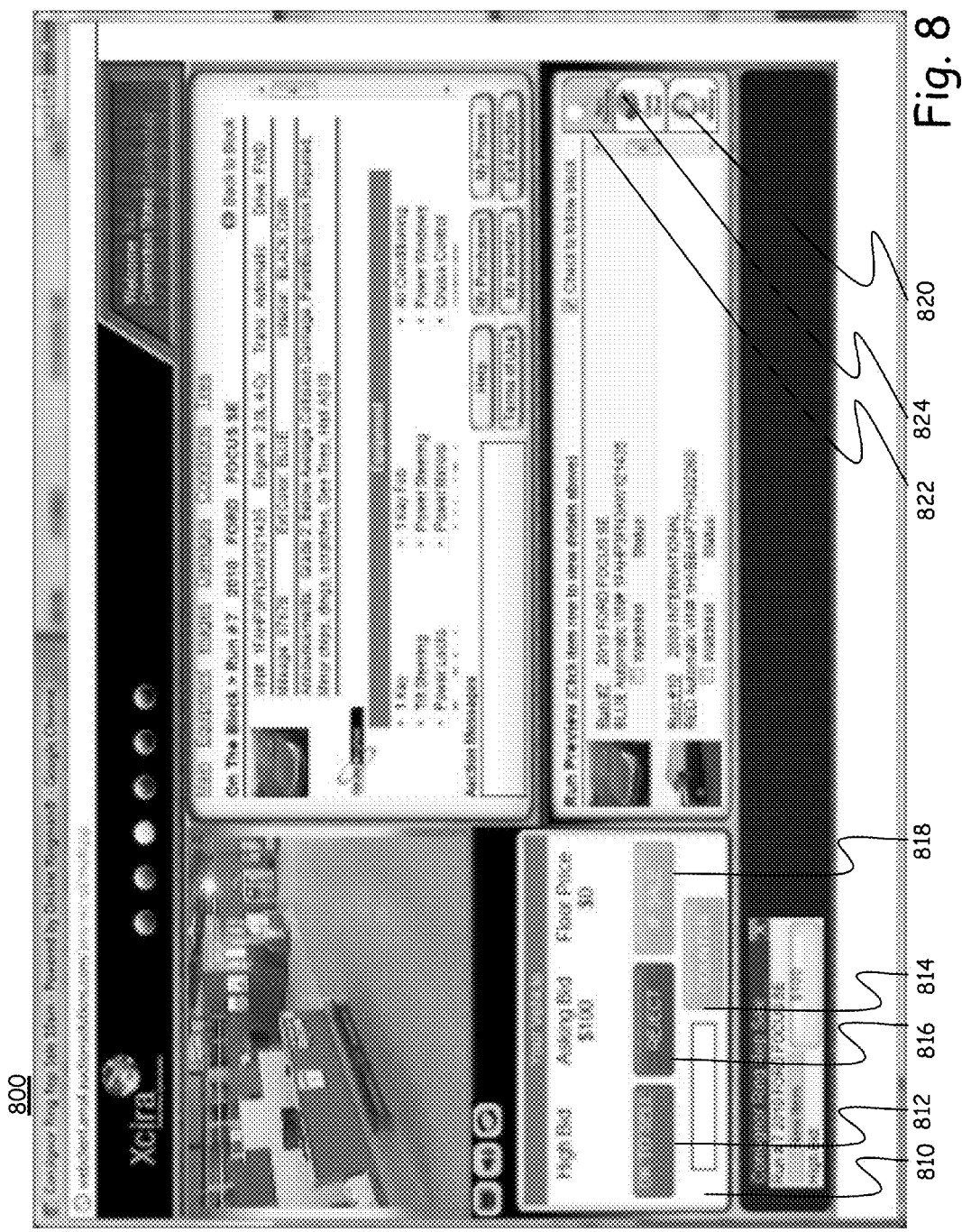
FIG. 8 is a screen shot representing another aspect or feature that can be incorporated into various embodiments.

FIG. 8 is a screen shot representing another aspect or feature that can be incorporated into various embodiments. The illustrated screen shot is a base bidder display that transforms during the auctioning process to become a seller rep display. The screen 800 thus includes a seller rep function block 810 which includes a button to approve a sell at a current high bid amount 812, a dialog box fur submitting a counter offer to the auction/high bidder along with a submit button 814, a button 816 to reject the sale at a price lower than the floor/reserve price and a button to activate an "if sale" condition 818. In addition, the seller has a tabularized box in which the seller can select one of a variety of tabbed pages. In the illustrated embodiment, the tabbed pages include a page to show the bid history for a current item 820, a tab to view the sale inventory for an auction 822 and a tab to open a chat dialog with the clerk and/or auctioneer 824. Thus, when a seller's item is "on the auction block" the screen, based on the seller ID in the database, then can take on the look of the illustrated screen.

Figure 9:
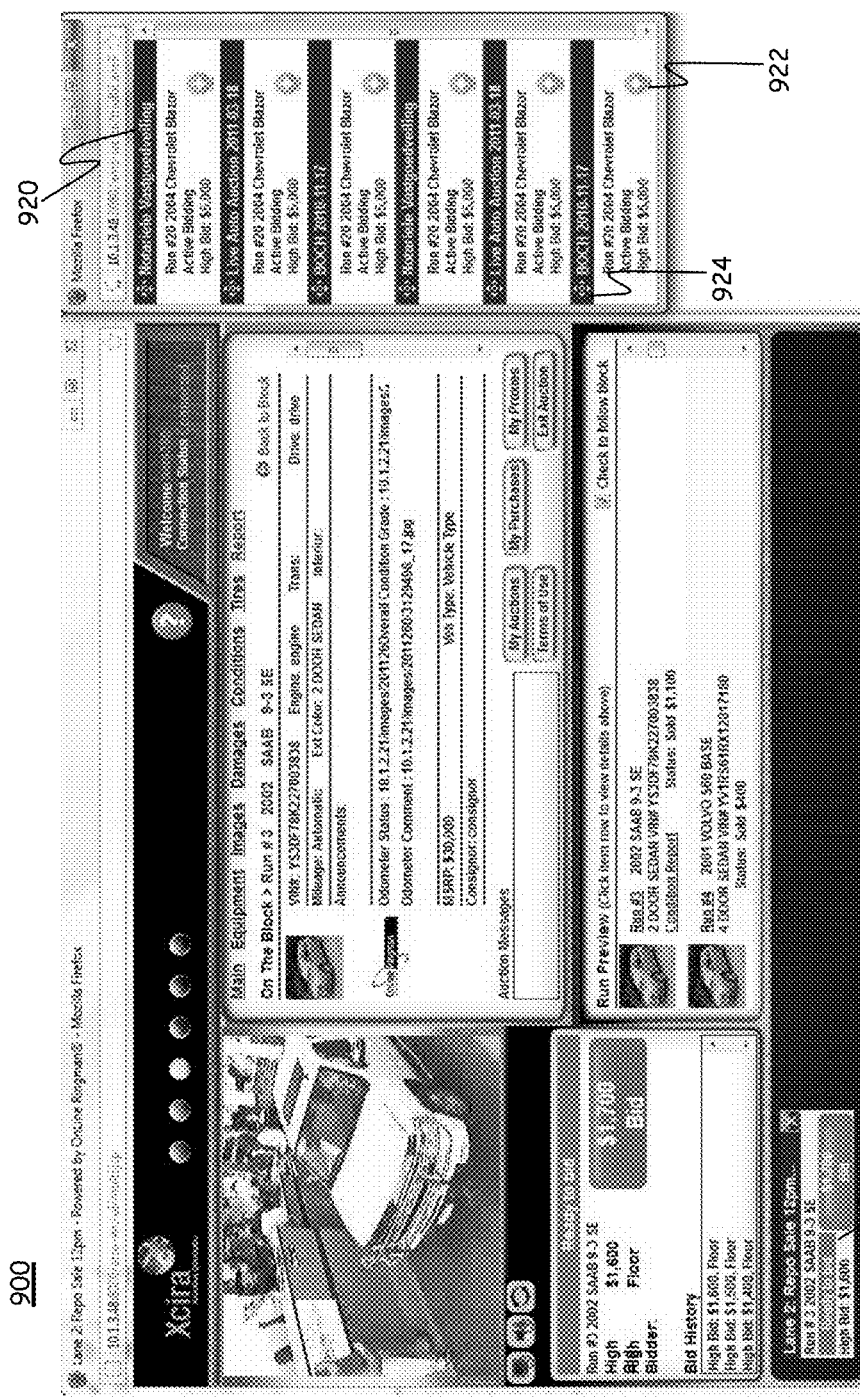
FIG. 9 is a screen shot illustrating a multi-lane login feature from the user interface.

FIG. 9 is a screen shot illustrating a multi-lane login feature from the user interface. In the illustrated screen shot, the functionality of being able to launch additional lanes without having to go back to the main website is illustrated. Thus, the user can be monitoring and/or participating in a current auctioning event using a mobile device, such as a mobile smart phone or a dedicated OEM type device, as well as a desktop or laptop computer system, or a tablet, etc. Similar to the above-described embodiments, the screen 900 may include an auction bidding dashboard 910. The user can bid directly from the dashboard or change the current "auction in view" to one of the auctions presented in the dashboard 910. From this screen, the user can cause the auction control dashboard 920 to pop up and thus present the user with a list of possible lanes that the user is authorized or permitted to attend. In addition, in the auction control dashboard includes the status of the auction such as providing the run number, the high bid price, etc. The user can add any lane/ring to the auction bidding dashboard simply by selecting the add button illustrated as a circle with a "+" 922 in the illustrated screen shot, dragging the lane/ring over to the dashboard, double clicking on the lane/ring, etc. The user can also modify the priority of the ring in the list by selecting the icon preceding the lane/ring name on the bar 924. Thus, the user can be notified or gain access to list of auctioning events that are taking place and for which the user is able to participate. This list may be generated based on the buyers interest, sellers interest, detected and/or monitored activity of the user, profile information of the user, bid history or purchase history of the user, as well as other factors. The user can then observe the available events and then easily add the events to the user's dashboard for direct bidding or participation from the dashboard or, by setting the auction as the current auction.

Figure 10A:
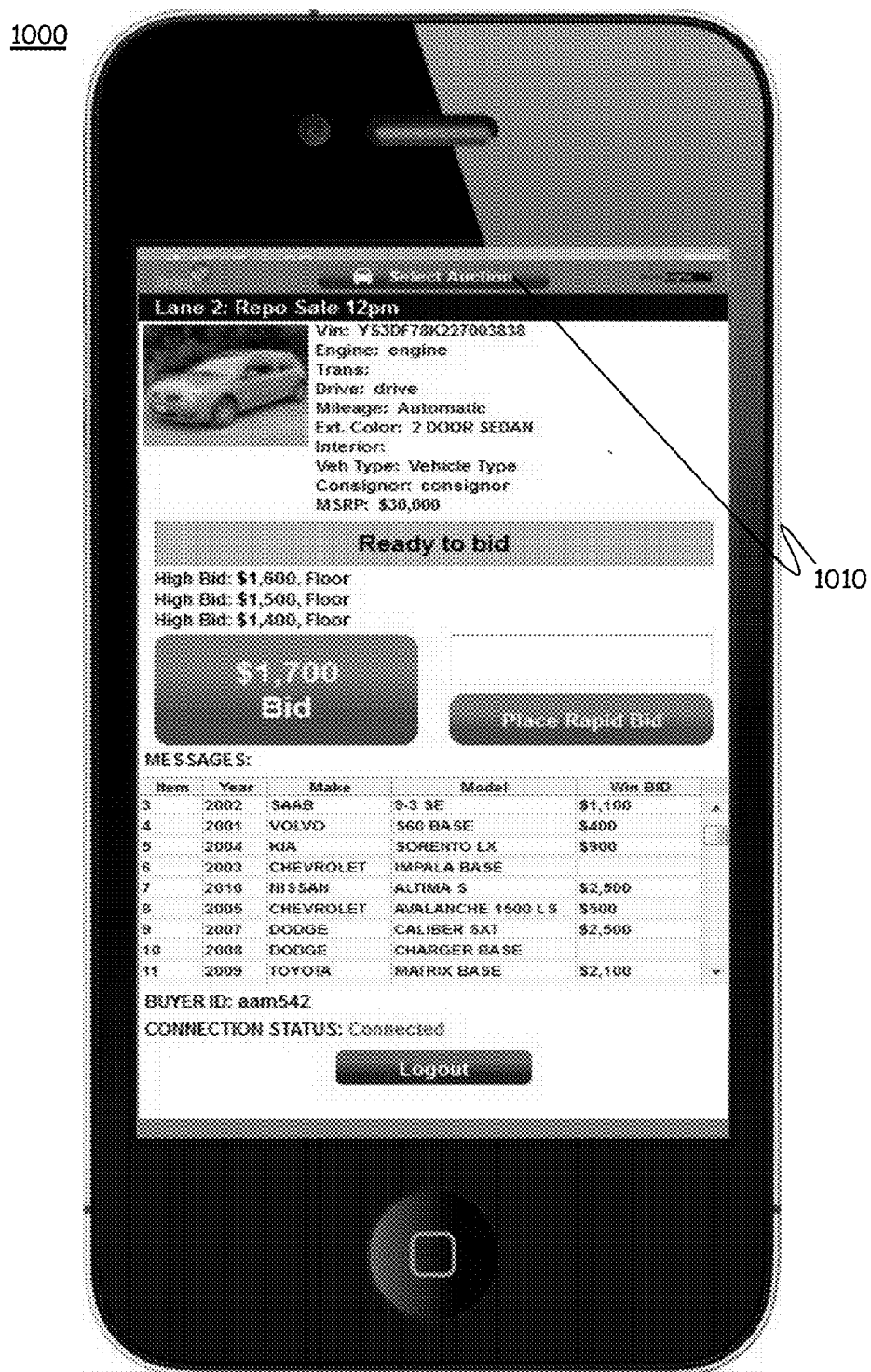
FIG. 10A and FIG. 10B are two screen shots illustrating a mobile embodiment of the auction control dashboard.
Figure 10B:
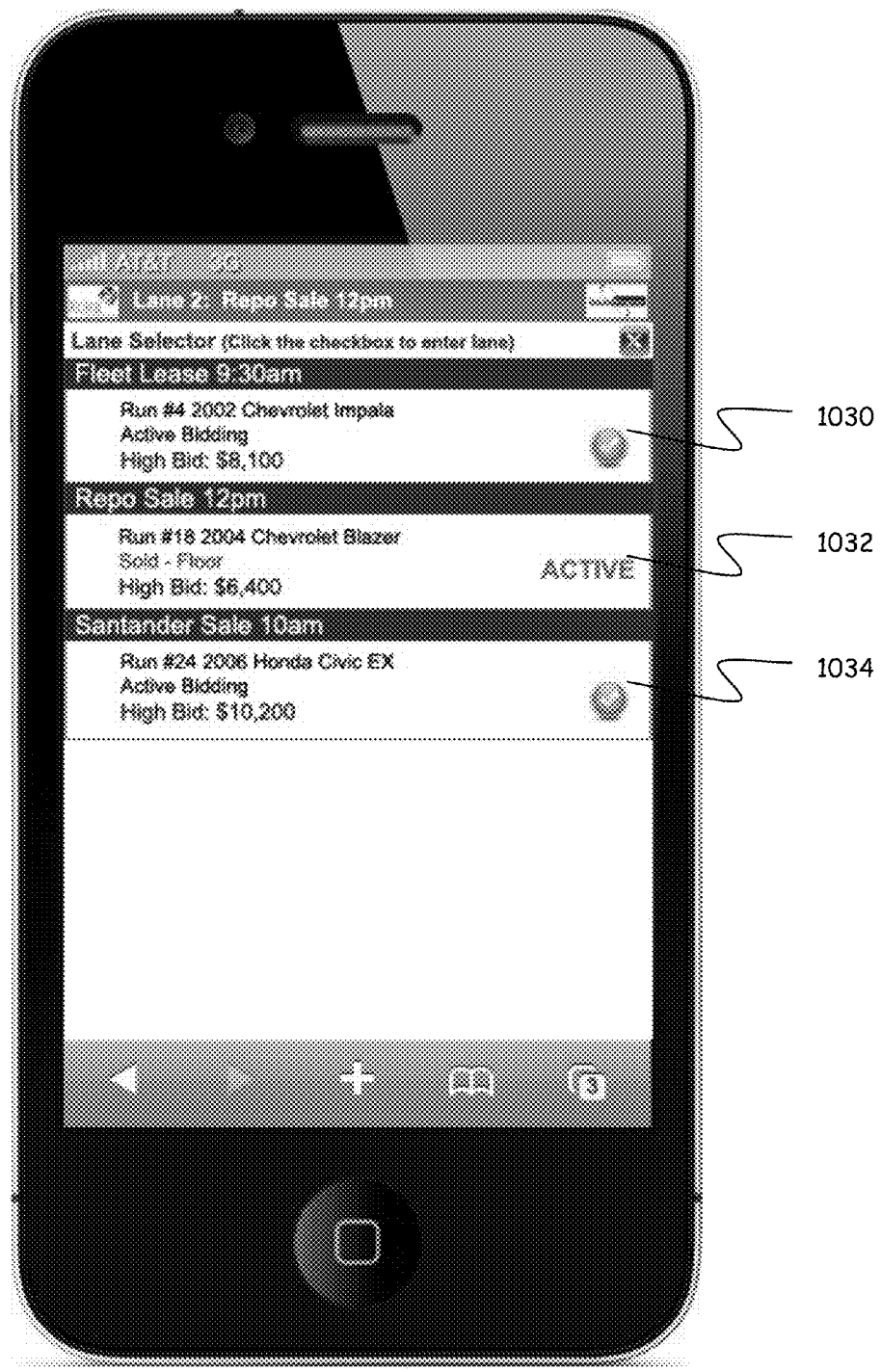

FIG. 10A and FIG. 10B are two screen shots illustrating a mobile embodiment of the auction control dashboard. In FIG. 10A, the screen is shown as displaying a current auctioning event 1000. If the user actuates the select auction button 1010, the screen switches to the auction control dashboard as illustrated in FIG. 10B. In the auction control dashboard 1020, the user can select a different lane/ring to attend. In the illustrated example, three lane/rings are shown as being available with a Fleet Lease starting at 9:30 AM for a 2002 Chevrolet Impala 1030, a Repo Sale at 12 PM—which is active—for a 2004 Chevrolet Blazer 1032 and a Santander Sale at LOAM for a 2006 Honda Civic EX 1034.

Figure 11:
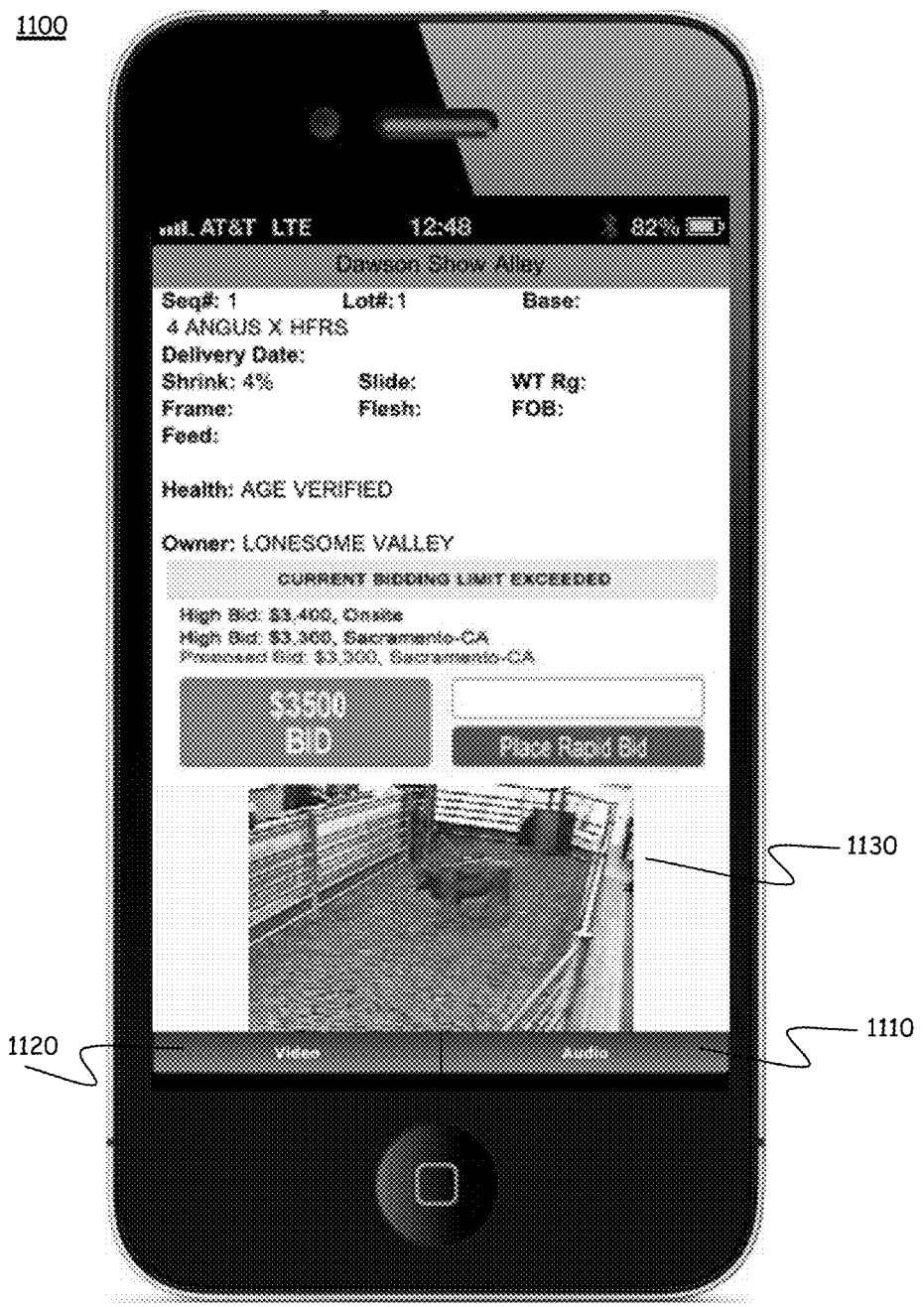
FIG. 11 is a screen shot of a portable embodiment showing that the mobile environment can include audio and video during the auctioning event.

FIG. 11 is a screen shot of a portable embodiment showing that the mobile environment can include audio and video during the auctioning event. The screen 1100 includes soft buttons to allow the user to gain access to audio controls 1110 and video controls 1120. The video 1130 is presented directly on the user screen of the mobile device.

The embodiments described herein have focused on multiple auctioning events occurring in a single auction house. However, it will be appreciated that the various aspects and features of the present invention are not limited to operation for a single auction house. Rather, the active and mini-bidding screens displayed to a remote bidder can represent auctions that are taking place on a global basis. Advantageously, the present invention allows a single bidding entity to then cover multiple simultaneously occurring auctions being performed in geographically dispersed locations.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or aspects or possible combinations of the features or aspects. Variations of embodiments of the present invention that are described and embodiments of the present invention comprising different combinations of features noted in the described embodiments will occur to persons of skill in the art. The present invention may be implemented by any one of, or any combination of, software, hardware, and/or firmware. In the description and claims, each of the verbs, "comprise" "include" and "have", and conjugates thereof, are used to indicate that the object or objects of the verb are not necessarily a complete listing of members, components, elements or parts of the subject or subjects of the verb.

What is claimed is:

1. A system that enables an individual to participate in an active auction over a network using a processing device, the individual either being at the location at which the active auction is occurring or from a remote location, the auction being attended by one or more other entities, the system comprising:

a processor configure to:
    receive auction bids from the processing device of the individual for an item that is being auctioned;
    receive the entry of bid information from the one or more other entities; and
    transmit bid status information toward the processing device of the individual;

an audio system coupled to the network, the audio system configured to:
    capture live audio from the active auction;
    transmit the live audio over the network towards the processing device such that a one second or less delay is realized at the processing device; and reduce the quality of streaming of the live audio to the processing device when such streaming interferes with the reception of bids or the transmitting of bid status information by causing a delay of more than approximately one second.

2. The system of claim 1, wherein the processor and the audio system are coupled to an IP network.

3. The system of claim 2, wherein the reception from the processing device and the transmission to the processing device is performed in accordance with TCP.

4. The system of claim 3, wherein the processing receives and transmits based on TCP.

5. The system of claim 3, wherein the processing receives and transmits based on UDP.

6. The system of claim 2, wherein the reception from the processing device and the transmission to the processing device is performed in accordance with UDP.

7. The system of claim 2, wherein the reception from the processing device and the transmission to the processing device is based at least in part on TCP.

8. The system of claim 2, wherein the reception from the processing device and the transmission to the processing device is based at least in part on UDP.

9. A method for enabling a remote individual to participate in an active auction for an item, the remote individual being able to participate over a network along with one or more onsite entities, the method comprising the actions of:
   capturing live audio data from the active auction;
   streaming the live audio data over the data network to a remote bidding device being utilized by the remote individual such that the live audio is received by the remote bidding device with a delay of approximately no more than one second or less;
   receiving bids from the remote bidding device for the item being auctioned;
   receiving bids from the one or more onsite entities for the item being auctioned;
   processing bids received from the remote bidding device and the onsite entities;
   transmitting bid status information to the remote bidding device; and
   reducing the quality of the streaming of the live audio data to the remote bidding device when such streaming interferes with the reception of bids or the transmitting of bid status information by causing a delay of more than approximately one second.

10. A system that enables a remote entity to participate in an active auction along with an onsite audience, the system comprising:
   a remote client interface communicatively coupled to an IP network;
   an audio system coupled to the IP network and that is configured to capture and stream live audio from the active auction out of the remote client interface towards a remote client over the IP network while maintaining a delay of approximately one second or less;
   the remote client communicatively coupled to the IP network and configured to receive the live audio from the audio system, receive information pertaining to an item being auctioned at the active auction and to transmit a bid of the remote entity for the item being auctioned;
   a processing system configured to:
      process auction bids received from one or more onsite bidders and the remote client for the item being auctioned;
      transmit to the remote client over the remote client interface information pertaining to the item being auctioned;
      receive auction bids from the one or more remote clients through the remote client interface for the item being auctioned;
      stream the live audio and transmit information regarding the auction status to remote client over the remote client interface;
      reduce the quality of the live audio stream to the remote client when such streaming interferes with the reception of bids or the transmitting of bid status information by causing a delay of more than approximately one second.

11. The system of claim 10, further comprising:
a video system that is configured to:
   capture real-time video from the live auction site; and
   stream the real-time video from the live auction site to the one or more remote clients.

* * * * *